UNITED STATES PATENT OFFICE.

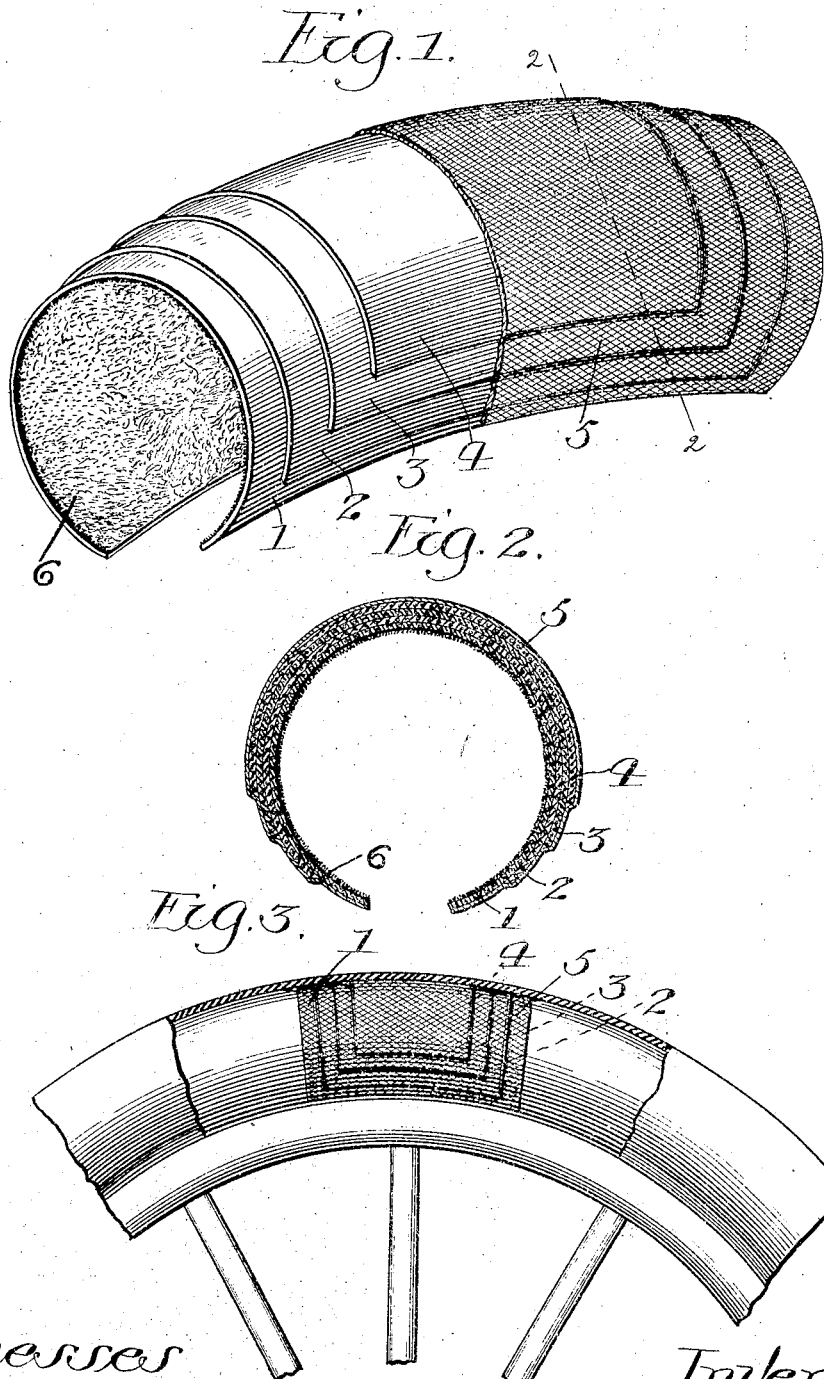

JOHN C. HERMAN, OF CHICAGO, ILLINOIS.

TIRE-REPAIR DEVICE.

950,172. Specification of Letters Patent. Patented Feb. 22, 1910.

Application filed December 14, 1908. Serial No. 467,364.

*To all whom it may concern:*

Be it known that I, JOHN C. HERMAN, a citizen of the United States, residing at the city of Chicago, in the county of Cook and State of Illinois, have invented a new and useful Improvement in Tire-Repair Devices, of which the following is a specification.

This invention relates to repair devices for automobile and other tires which have an inner tube and an outer protecting casing.

When the outer casing is accidentally cut or torn the air pressure in the inner tube forces the material thereof into and through the aperture in the casing, and a rupture of such exposed portion of the inner tube produces what is known as a "blow out." As far as the inner tubes are concerned the conditions resulting from such an accident are readily met by carrying extra tubes and reserving the injured ones for later repair. Carrying such tubes occasions little inconvenience, for they are light and compact. It has also been the usual practice to carry one or more extra casings for such emergencies, but such casings are expensive, heavy, and of such bulk that it is necessary to carry them attached to some exterior part of the machine, where they are inconvenient and unsightly.

My invention provides a structure of such character that it may be readily applied to casings which may be torn or cut and afford a support therefor, that will fully protect the inner tube, and in turn be protected by the outer casing, that is light and compact and which, while serving as an emergency repair, is also of permanent and substantial character and will give good service in continued use.

The principles of my invention are illustrated in the drawings, in which—

Figure 1 is a perspective view of a repair device constructed in accordance with my invention, a portion of the outer layer being broken away to better illustrate the manner in which the layers are superposed. Fig. 2 is a cross section of the same on the line 2—2 of Fig. 1, and Fig. 3 represents the same applied to an automobile tire, a portion of the latter being broken away.

In preparing my improved device I take a number of pieces of fabric, comprising a fibrous foundation and a rubber filling. These pieces 1, 2, 3, 4, preferably should be cut diagonally of the threads of the fabric or "on the bias", and the comparative sizes of the pieces should be so arranged on each other that a uniform and gradual slant will be given from the edge of the inner and largest one 1 to the edge of the outer and smallest one 4. The smallest piece should be of such size that it will cover any cut or tear to which a tire may ordinarily be subjected. The rubber portion of these members should be softened by a suitable solvent, such as gasolene, and the whole placed upon a form representing the curvature and approximate diameter of the tires for which the device is intended. The whole is then ripened or vulcanized in the usual manner. A layer of cheese cloth or other open meshed material 5 should be spread over the exterior of the shoe and the whole coated with a pure rubber cement. This will partially level the exterior slanted or stepped portion and provide a means for fastening the device in place, as hereinafter explained. Finally the inside should be given a coating of asbestos 6, which will act as a non-conductor of heat, and also allow for suitable play or movement of the inner tube and without permitting it to stick or bind.

When an accident occurs by which the outer tube is cut or torn, it is removed and the inner tire (if necessary) replaced or repaired in the usual manner. But, instead of applying a spare casing or using a shoe strapped outside the casing, my device is applied as a support and repair to the inside of the injured one. The inside portions of such tire adjacent to the opening are thoroughly cleansed with gasolene, which is also applied to the exterior of my repair device. The rubber cement is thereby softened and the shoe is then put in place. It will instantly adhere to the cleansed portions of the casing and the soft cement will cause a smooth and uniform attachment thereto. When replaced it will be found that, in ordinary cases, the repair will be sufficient for permanent use and support of the tire. In any case it will fully protect the inner tube whose pressure is communicated directly to the casing, and the injured parts of the latter will be held firmly together until permanent repair, if necessary, can be made.

I claim:

1. As a new article of manufacture, a tire repair device consisting of a shoe adapted to conform in shape to a section of the tire, the said shoe being formed of a plurality of superposed layers of rubber fabric secured together and gradually increasing in size from the outermost to the innermost layer, and means for securing the shoe to the inner face of an outer tire.

2. A tire repair device comprising a multiplicity of layers of material of different sizes superimposed upon each other and secured together so as to form a slanted face, a fabric covering over said face, and a layer of plastic cement throughout said fabric covering to secure the same thereto and to the tire.

3. In a tire repair device a multiplicity of layers of rubber fabric of different sizes superimposed on each other to form a slanted face, and a fabric covering placed over said face and cemented thereto.

4. In a tire repair device a multiplicity of layers of rubber fabric of different sizes superimposed on each other, and secured together to form a slanted or stepped face, and a layer of material on said face adapted to even the inequalities thereof, and an asbestos coating within said device.

In witness whereof, I have hereunto set my hand, this 8th day of December A. D. 1908, in the presence of two subscribing witnesses.

JOHN C. HERMAN.

Witnesses:
C. K. CHAMBERLAIN,
A. S. PHILLIPS.